United States Patent
Legl et al.

(10) Patent No.: US 6,584,659 B2
(45) Date of Patent: Jul. 1, 2003

(54) APPARATUS FOR NEEDLING A NON-WOVEN MATERIAL

(75) Inventors: Ludwig Legl, Buchkirchen (AT); Robert Strasser, Langenstein (AT); Andreas Plump, St. Georgen (AT)

(73) Assignee: Textilemaschinenfabrik Dr. Ernst Fehrer Aktiengesellschaft, Leonding (AT)

( * ) Notice: Subject to any disclaimer, the term of this patent is extended or adjusted under 35 U.S.C. 154(b) by 0 days.

(21) Appl. No.: 10/234,626

(22) Filed: Sep. 4, 2002

(65) Prior Publication Data

US 2003/0041424 A1 Mar. 6, 2003

(30) Foreign Application Priority Data

Sep. 6, 2001 (AT) .......................... 1407/2001

(51) Int. Cl.[7] .............................................. D04H 18/00
(52) U.S. Cl. .......................................... 28/114; 28/107
(58) Field of Search ........................ 28/107, 114, 113, 28/108, 109, 110, 111, 112, 115; 475/162, 174; 112/80.4, 80.41, 80.42

(56) References Cited

U.S. PATENT DOCUMENTS

| | | | | |
|---|---|---|---|---|
| 1,742,133 A | * | 12/1929 | Chase ........................ 28/114 |
| 3,150,434 A | * | 9/1964 | O'Byrne ..................... 28/114 |
| 3,508,307 A | * | 4/1970 | Dilo ........................... 28/114 |
| 3,845,529 A | * | 11/1974 | Van Deusen et al. ......... 28/114 |
| 4,884,324 A | * | 12/1989 | Stanislaw .................... 28/107 |
| 4,891,870 A | * | 1/1990 | Muller ........................ 28/113 |
| 5,277,670 A | * | 1/1994 | Tenberge .................... 475/81 |
| 5,685,534 A | * | 11/1997 | Zeltner ....................... 271/108 |
| 5,732,453 A | | 3/1998 | Dilo et al. |
| 6,000,112 A | * | 12/1999 | Ollinger et al. .............. 28/107 |
| 6,161,269 A | | 12/2000 | Dilo et al. |
| 6,266,856 B1 | * | 7/2001 | Fehrer et al. ................. 28/107 |
| 6,305,058 B1 | * | 10/2001 | Fehrer ........................ 28/107 |

FOREIGN PATENT DOCUMENTS

DE          19615697          3/1997

* cited by examiner

Primary Examiner—A. Vanatta
(74) Attorney, Agent, or Firm—Collard & Roe, P.C.

(57) ABSTRACT

An apparatus is described for needling a non-woven material with a support (1) for at least one needleboard (3) with at least two eccentric drives (7, 8) which are drivably connected with the support (1) via connecting rods (9, 10) and with a device for adjusting the mutual angular position of the two eccentric drives (7, 8). In order to provide advantageous constructional conditions it is proposed that the device for adjusting the mutual angular position of the two eccentric drives (7, 8) consists of a superposition gear (17) in a gear train (11) for the drive connection of the two eccentric drives (7, 8).

3 Claims, 3 Drawing Sheets

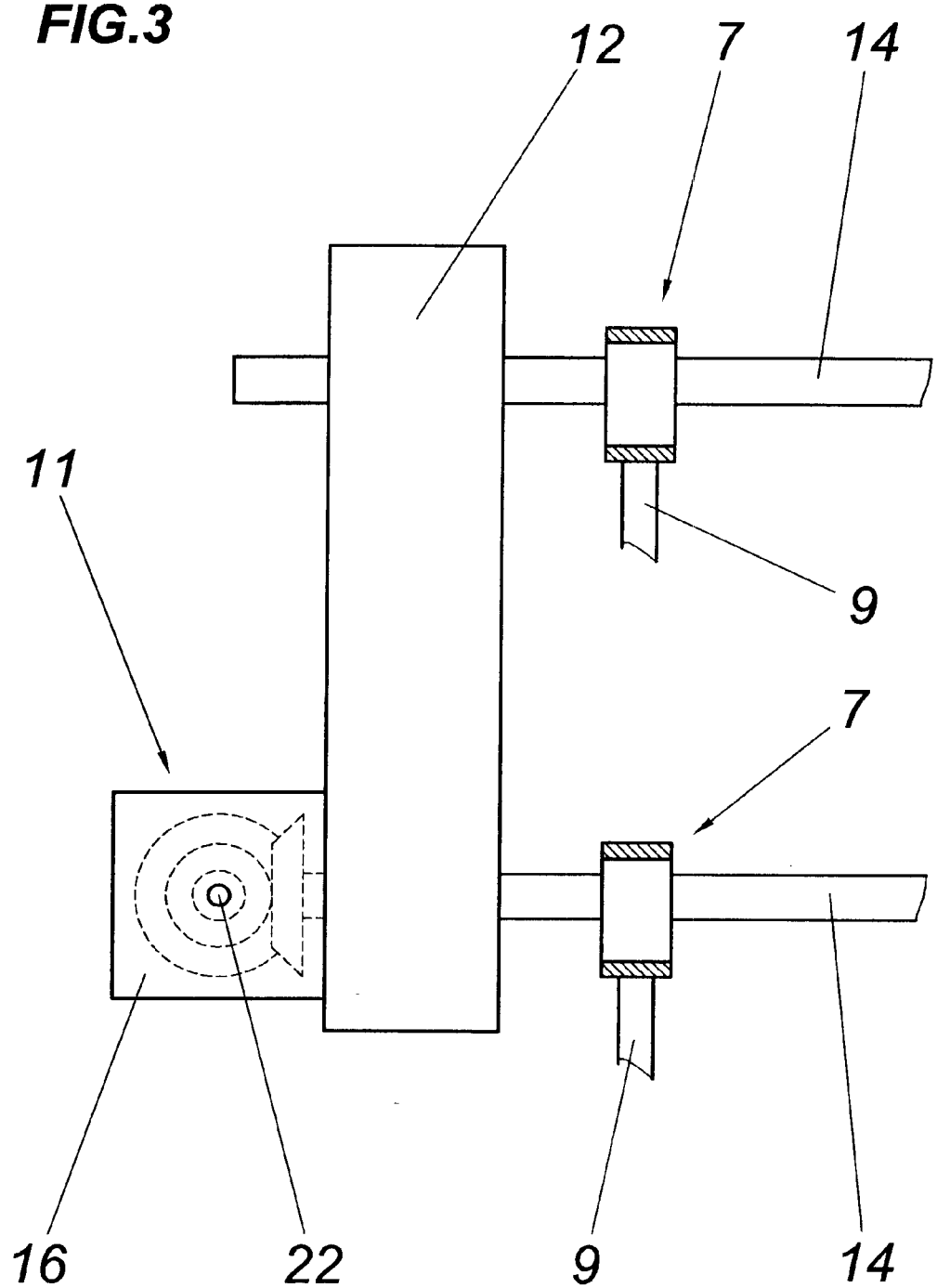

APPARATUS FOR NEEDLING A NON-WOVEN MATERIAL

1. FIELD OF THE INVENTION

The invention relates to an apparatus for needling a non-woven material with a support for at least one needleboard with at least two eccentric drives which are drivably connected with the support via connecting rods and with a device for adjusting the mutual angular position of the two eccentric drives.

2. DESCRIPTION OF THE PRIOR ART

For the purpose of the reciprocating drive of a needleboard not only in the direction of the needle penetration but also in the direction of the advance of the non-woven material it is known in needling apparatuses (EP 0 892 102 A2) to provide, in addition to the two eccentric drives which are drivable in opposite directions, two additional eccentric drives which are drivable in opposite directions for the needleboard drive in the needle penetration direction and whose connecting rods are connected by a coupling linked to a support for the needleboard. As a result of a respective choice of the mutual angular position of the two eccentric drives it is possible to set the throw of the needleboard advance in the direction of passage of the non-woven material. For this purpose the two eccentric drives are driven by separate motors which are driven via a control device according to a predetermined mutual angular position, which entails considerable efforts regarding the drive and the control systems.

SUMMARY OF THE INVENTION

The invention is thus based on the object of providing an apparatus for needling a non-woven material of the kind mentioned above in such a way that the mutual angular position of the two eccentric drives for setting the drive conditions for the needleboard support, which drive conditions can be determined by said eccentric drives, can be set in a simple manner with a low amount of control efforts also while the needleboard is driven.

This object is achieved by the invention in such a way that the device for adjusting the mutual angular position of the two eccentric drives consists of a superposition gear in a gear train for the drive connection of the two eccentric drives.

In a superposition gear, the basic gear ratio given between a drive member and a driven member can be changed via an additional drive member because the speed of the driven member is determined by the superposition of the speeds of the two drive members. If the additional drive member is held against rotation, the basic gear ratio is obtained which can be utilized for the synchronous drive connection of the two eccentric drives. The angular position between the drive member and the driven member is adjusted via an adjustment of the angle of rotation of the additional drive member, which leads to the setting of a random angular position of the two eccentric drives if it is ensured that the entire gear ratio of the gear train connecting the two eccentric drives is 1. This can be ensured in a simple way such that the superposition gear shows a basic gear ratio of 1.

Since the eccentric drives which are to be set concerning their mutual angular position comprise parallel eccentric shafts, it is recommended to connect the superposition gear via angular gears with the eccentric drives in order to create simple constructional conditions for the gear train between the two eccentric drives.

Although the use in accordance with the invention of proven superposition gears for setting the motion stroke of needleboard drives with separate eccentric drives for the needleboard movement in the needle penetration direction and the direction of advance of the non-woven material can be utilized advantageously, particularly advantageous constructional conditions can be obtained when the connecting rods of the two opppositely drivable eccentric drives for the needleboard drive in the needle penetration direction do not comprise a middle position conventionally extending in the needle penetration direction, but extend in an opposite inclined manner with respect to the needle penetration direction, so that as a result of the phase shift between said two eccentric drives the support for the needleboard can be driven along an inherently closed trajectory which allows an advantageous adjustment of the needle movement to the advance of the non-woven material when the support is guided parallel with respect to itself, which can be ensured by a hinged parallelogram guidance of the support via at least one additional eccentric drive. Since with the phase shifting between the two eccentric drives it is not only possible to set the throw of the needleboard advance in the direction of passage of the non-woven material but also in the needle penetration direction, the additional advantageous possibility is obtained to structure the non-woven material by changing the needle penetration depth of the needles in the non-woven material during the needling process and to thus provide the material with a pattern. The change of the needle penetration depth can be made within a few needleboard strokes.

BRIEF DESCRIPTION OF THE DRAWING

The subject matter of the invention is shown in the drawing by way of example, wherein:

FIG. 3 shows a front view of the gear train.

Figure 1:
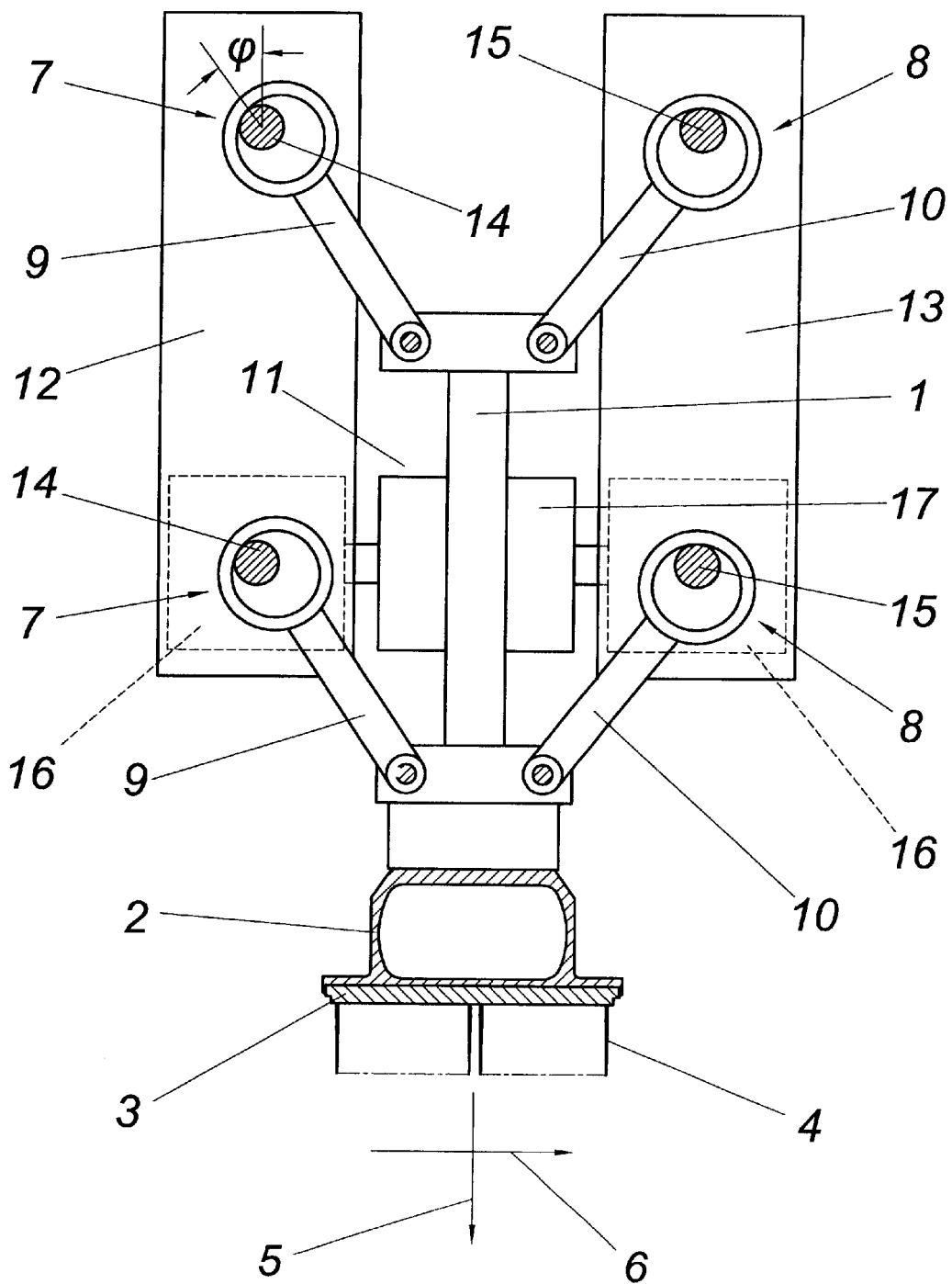
FIG. 1 shows an apparatus in accordance with the invention for needling a non-woven material in sections in a schematic longitudinal sectional view.

As is shown especially in FIG. 1, the needling apparatus comprises a support 1 for the needleboard 3 which is exchangeably held in a needle beam 2, which needleboard is driven with its needles 4 in a reciprocating manner both in the needle penetration direction 5 as well as in the direction of passage 6 of the non-woven material. For this purpose two pairs of eccentric drives 7 and 8 are provided whose connecting rods 9 and 10 are linked to support 1. The arrangement is made in such a way that the eccentric drives 7 on the one hand and the eccentric drives 8 on the other hand each form a hinged parallelogram for guiding the support 1 which thus can merely be displaced parallel with respect to itself. If the eccentric drives 7 and 8 are driven without mutual phase shifting, the support 1 is exclusively driven reciprocatingly in the needle penetration direction 5, namely with a stroke corresponding approximately to twice the eccentricity of the eccentric drives 7, 8. If on the other hand one of the eccentric drives 7 and 8 as are arranged in pairs are twisted with respect to the respective other eccentric drive by a phase angle φ, then the support 1 is driven reciprocatingly not only in the needle penetration direction 5 but also in the direction of advance 6 of the non-woven material, namely along a trajectory whose shape depends not only on the phase shift φ, but also on the magnitude of the eccentricity of the eccentric drives 7 and 8, the length of the connecting rods 9 and 10 and the inclination of the middle connecting rod position with respect to the needle penetration direction 5.

A gear train 11 is used for setting the phase angle φ between the eccentric drives 7 and 8, which train is provided between the two gears 12 and 13 on the one hand for the drive connection of the eccentric shafts 14 of the eccentric drives 7 and on the other hand for the drive connection of the eccentric shafts 15 of the eccentric drives 8. Said gear train 11 comprises two angular gears 16 which are each drivably connected with an eccentric shaft 14 and 15 and a superposition gear 17 between the two angular gears 16. The superposition gear 17 is formed by a planetary gear system whose drive member according to FIG. 2 drives a driven member 20 via an intermediate wheel 19, which driven member is in drive connection with the gear 12 for the eccentric shafts 14. The intermediate wheel 19, which is held on a fixed link 21, can be displaced via the fixed link 21 as an additional drive member by a shaft 22 with the effect that the phase angle φ between the eccentric drives 7 and 8 changes accordingly. Since the basic gear ratio of the superposition gear 17 is 1, the synchronous drive of the eccentric drives is maintained. The fixed link 21 can also be rotated back and forth via the shaft 22 about a middle position depending on the drive movement in the needle penetration direction 5 in order to enable the adjustment of the trajectory of support 1 with respect to the respective requirements of the needleboard drive.

Figure 2:
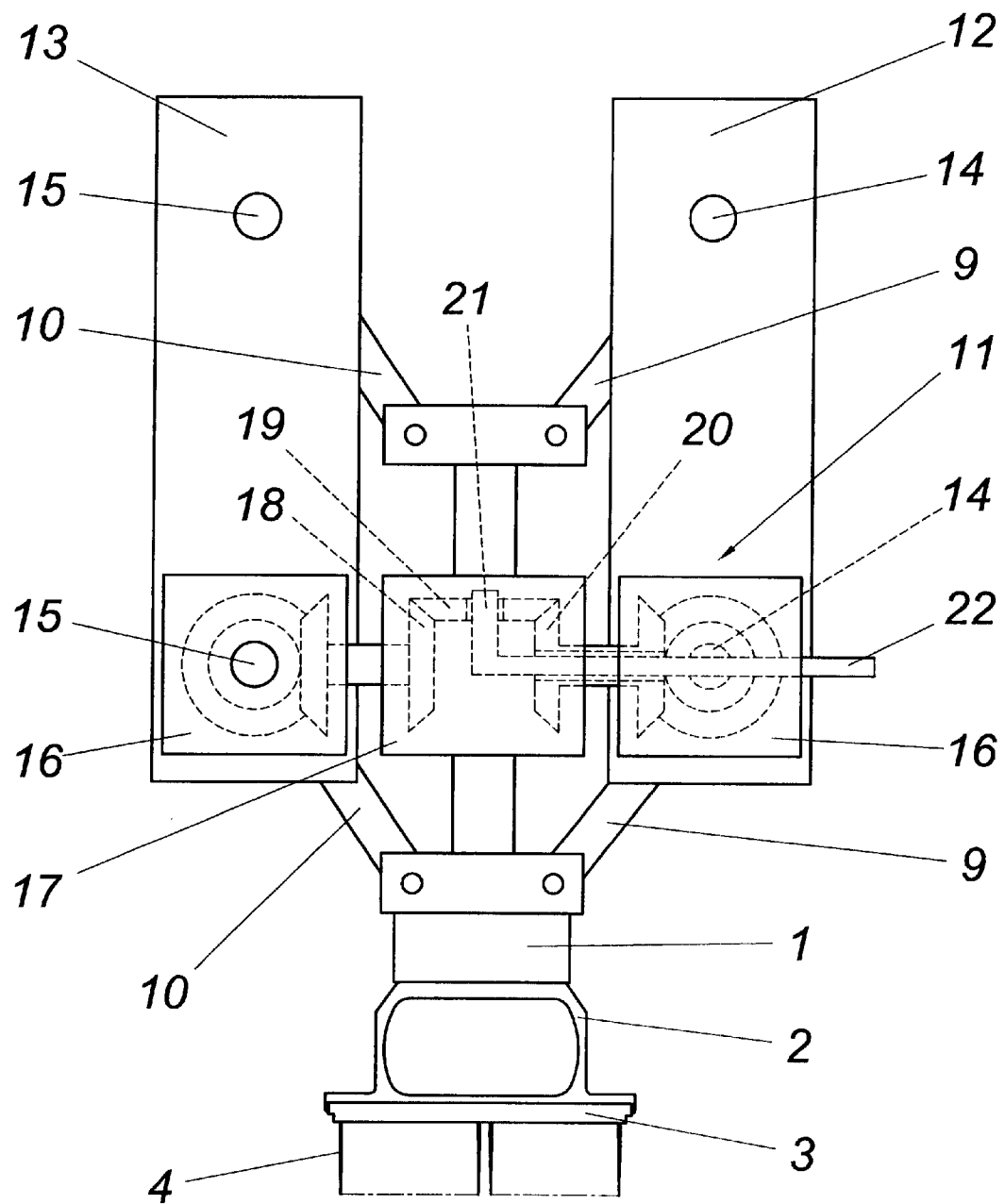
FIG. 2 shows a schematic side view of the gear train connecting the two eccentric drives.

It is understood that the superposition gear 17 as indicated in FIG. 2 merely shows the fundamental constructional conditions and in no way needs to be designed in the illustrated form because the relevant aspect is merely the adjustment of the phase angle φ via a respective superposition gear.

What is claimed is:

1. An apparatus for needling a non-woven material with a support for at least one needleboard with at least two eccentric drives which are drivably connected with the support via connecting rods and with a device for adjusting the mutual angular position of the two eccentric drives, characterized in that the device for adjusting the mutual angular position of the two eccentric drives (7, 8) consists of a superposition gear (17) in a gear train (11) for the drive connection of the two eccentric drives (7, 8).

2. An apparatus as claimed in claim 1, characterized in that the superposition gear (17) has a basic gear ratio of 1.

3. An apparatus as claimed in claim 1, characterized in that the superposition gear (17) is drivably connected via angular gears (16) with the eccentric drives (7, 8).

* * * * *